(12) United States Patent
Armstrong et al.

(10) Patent No.: US 12,004,480 B2
(45) Date of Patent: Jun. 11, 2024

(54) MOBILE PET CARRIER

(71) Applicant: Diggs Inc., Long Island City, NY (US)

(72) Inventors: Courtney Armstrong, Queens, NY (US); Gregory Hoge, Queens, NY (US); Adriana Morante, Queens, NY (US); Isaac Haverlick, Jersey City, NJ (US); Lilly Althauser-Benson, Brooklyn, NY (US); Zel Alexander Crampton, Brooklyn, NY (US); Mark Prommel, Montclair, NJ (US); Pil Ho Chung, Palisades Park, NJ (US); Veronica Lin, New York, NY (US)

(73) Assignee: Diggs Inc., Long Island City, NY (US)

( * ) Notice: Subject to any disclaimer, the term of this patent is extended or adjusted under 35 U.S.C. 154(b) by 45 days.

(21) Appl. No.: 17/985,800

(22) Filed: Nov. 11, 2022

(65) Prior Publication Data
US 2023/0172155 A1 Jun. 8, 2023

Related U.S. Application Data

(60) Provisional application No. 63/278,892, filed on Nov. 12, 2021.

(51) Int. Cl.
*A01K 1/02* (2006.01)
(52) U.S. Cl.
CPC .................. *A01K 1/0254* (2013.01)
(58) Field of Classification Search
CPC .. A01K 1/0254; A01K 1/0035; A01K 1/0245; A01K 1/029; A01K 1/034; A45C 9/00; A45F 3/04; A45F 4/00
See application file for complete search history.

(56) References Cited

U.S. PATENT DOCUMENTS 5,117,883 A 6/1992 Chen
6,076,485 A * 6/2000 Peeples ................ A01K 1/0254
119/500
(Continued)

FOREIGN PATENT DOCUMENTS

WO 2018169693 A1 9/2018

OTHER PUBLICATIONS

"Travel Carrier", Wild One, Online at: https://wildone.com/products/pet-travel-carrier?title=spruce, available as of Sep. 18, 2020, 7 pages.
(Continued)

*Primary Examiner* — Yvonne R Abbott-Lewis
(74) *Attorney, Agent, or Firm* — Kilpatrick Townsend & Stockton LLP

(57) ABSTRACT

A mobile pet carrier having a base, first side, second side, third side, fourth side, and top member; and an interior compartment sized to hold an animal; the first side member defining a first side opening that provides access to the interior compartment through the first side member and having a first side opening cover; the top member defining a top opening that provides access to the interior compartment and having a top opening cover; the second side member defining a second side opening that provides access to the interior compartment and having a second side opening cover; the third side member having a side compartment that has a foldable panel movable between a closed position and an open position; and where, in the open position, a mesh portion of the third side member is exposed to provide ventilation to the interior compartment.

19 Claims, 12 Drawing Sheets

(56) References Cited

U.S. PATENT DOCUMENTS

| | | | | |
|---|---|---|---|---|
| 6,155,206 | A * | 12/2000 | Godshaw | A01K 1/0254 |
| | | | | 119/453 |
| 6,286,461 | B1 * | 9/2001 | Martz | A01K 1/0254 |
| | | | | 119/497 |
| 6,286,462 | B1 | 9/2001 | Burns | |
| 7,210,426 | B2 * | 5/2007 | Yeung | A01K 1/0254 |
| | | | | 119/497 |
| 7,665,421 | B2 * | 2/2010 | Martz | A01K 1/0254 |
| | | | | 119/497 |
| 7,789,044 | B2 * | 9/2010 | McGrade | A01K 1/0254 |
| | | | | 119/498 |
| 7,802,540 | B2 * | 9/2010 | Jakubowski | A01K 1/0254 |
| | | | | 119/497 |
| D649,719 | S * | 11/2011 | Siklosi | D30/109 |
| 9,532,548 | B2 | 1/2017 | Bryson | |
| D804,738 | S | 12/2017 | Nourollah | |
| D808,084 | S * | 1/2018 | Lu | D30/109 |
| D818,204 | S | 5/2018 | Renforth | |
| 10,433,522 | B2 * | 10/2019 | Renforth | A01K 1/0254 |
| 10,743,515 | B2 | 8/2020 | Lu | |
| 2008/0245312 | A1 * | 10/2008 | Leung | A01K 1/0245 |
| | | | | 119/497 |
| 2010/0175633 | A1 * | 7/2010 | Krauss | A01K 1/0254 |
| | | | | 119/497 |
| 2016/0192614 | A1 | 7/2016 | Hawk et al. | |

OTHER PUBLICATIONS

PCT/US2022/049740, "International Search Report and Written Opinion", Jun. 27, 2023, 17 pages.
PCT/US2022/049740, "Invitation to Pay Additional Fees and, Where Applicable, Protest Fee", May 3, 2023, 13 pages.

* cited by examiner

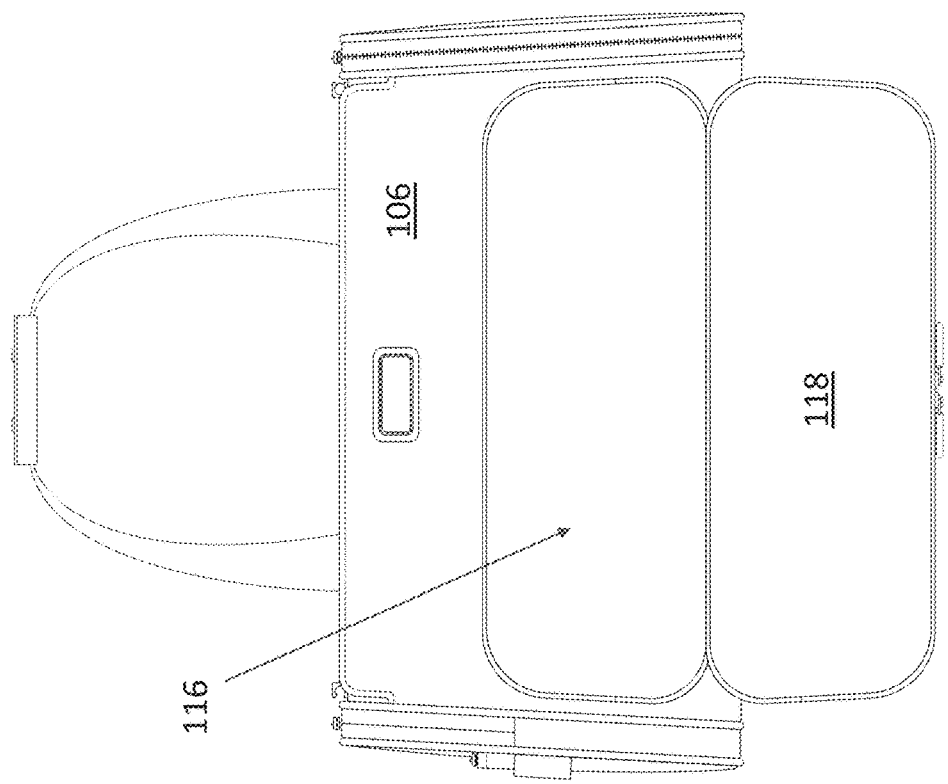
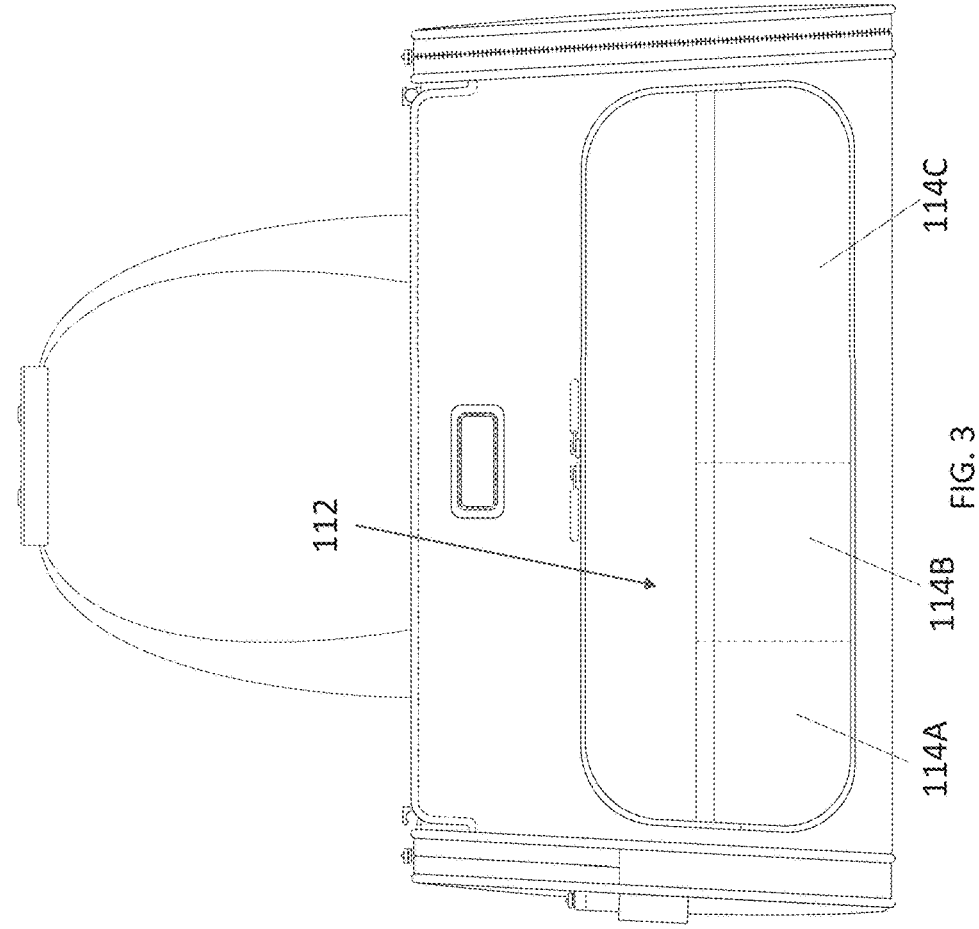

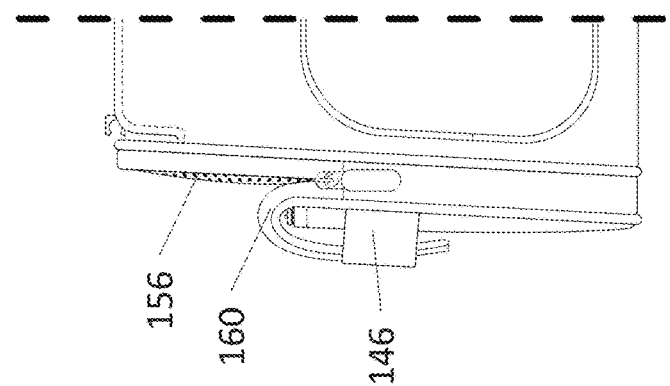
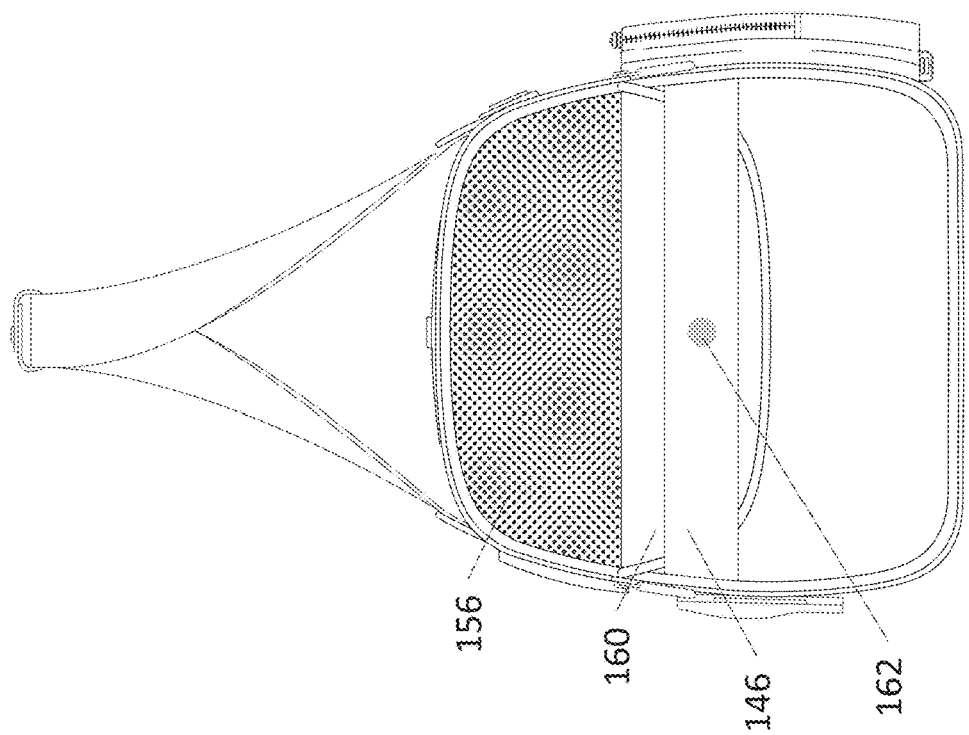
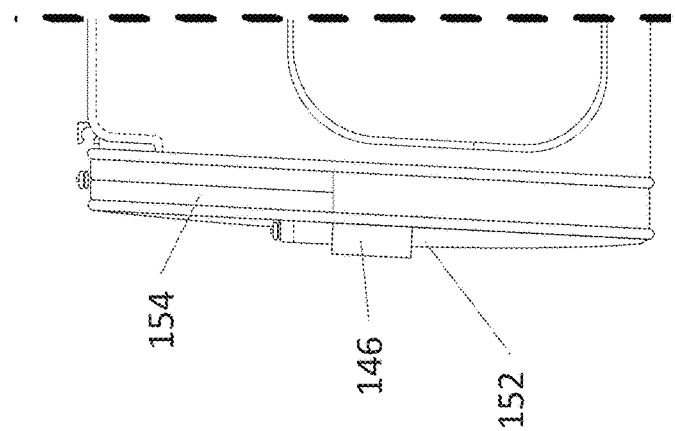

MOBILE PET CARRIER

CROSS REFERENCE TO RELATED APPLICATIONS

This application is related to and claims priority benefits from U.S. Provisional Application Ser. No. 63/278,892 ("the '892 application"), filed on Nov. 12, 2021, entitled MOBILE PET CARRIER. The '892 application is hereby incorporated in its entirety by this reference.

TECHNICAL FIELD

The present disclosure relates to the pet industry generally and more specifically to mobile pet carriers.

BACKGROUND

Often times, pet owners wish to travel with their pets. When traveling, especially when using public modes of transportation, e.g., planes, trains, buses, etc., the animal typically must be contained for the safety of both the animal and other passengers. Conventional carriers used to contain the pet are often inconsistent in size so they do not fit under certain seats, e.g., a plane seat, are constructed from cheap materials and are not durable, and do not have sufficient structure to meet various crash testing standards. It may be desirable to produce a mobile pet carrier that is a standard size, aesthetically pleasing, durable, and safe and comfortable for the animal.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments, a mobile pet carrier includes a base member, a first side member, a second side member, a third side member, a fourth side member, and a top member; and an interior compartment sized to hold at least one animal and defined by the base member, the first side member, the second side member, the third side member, the fourth side member, and the top member; wherein the first side member defines a first side opening that provides access to the interior compartment through the first side member and includes a first side opening cover that closes the first side opening using at least one first fastener; wherein the top member defines a top opening that provides access to the interior compartment and includes a top opening cover that closes the top opening using at least one second fastener; and wherein the second side member defines a second side opening that provides access to the interior compartment and includes a second side opening cover that closes the second side opening using at least one third fastener.

According to certain embodiments, a mobile pet carrier includes a base member, a first side member, a second side member, a third side member, a fourth side member, and a top member; and an interior compartment sized to hold at least one animal and defined by the base member, the first side member, the second side member, the third side member, the fourth side member, and the top member; wherein the third side member includes at least one pocket and at least one side compartment, the at least one pocket being coupled to an exterior portion of the at least one side compartment; wherein the at least one side compartment includes a foldable panel movable between a closed position and an open position; and wherein, in the open position, a mesh portion of the third side member is exposed to provide ventilation to the interior compartment.

According to certain embodiments, a mobile pet carrier includes a base member, a first side member, a second side member, a third side member, a fourth side member, and a top member; and an interior compartment sized to hold at least one animal and defined by the base member, the first side member, the second side member, the third side member, the fourth side member, and the top member; wherein the first side member defines a first side opening that provides access to the interior compartment through the first side member and includes a first side opening cover that closes the first side opening using at least one first fastener; wherein the top member defines a top opening that provides access to the interior compartment and includes a top opening cover that closes the top opening using at least one second fastener; wherein the second side member defines a second side opening that provides access to the interior compartment and includes a second side opening cover that closes the second side opening using at least one third fastener; wherein the third side member includes at least one pocket and at least one side compartment, the at least one pocket being coupled to an exterior portion of the at least one side compartment; wherein the at least one side compartment includes a foldable panel movable between a closed position and an open position; and wherein, in the open position, a mesh portion of the third side member is exposed to provide ventilation to the interior compartment.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

FIG. 3 is a front view of the mobile pet carrier of FIG. 1 showing interior pockets of the front pocket.

FIG. 4 is a front view of the mobile pet carrier of FIG. 1 with the front opening cover opened to reveal the front opening.

FIG. 12 is a partial front view of the mobile pet carrier of FIG. 1.

FIG. 13A is a left side view of the mobile pet carrier of FIG. 1 with the foldable panel secured between the strap and the side of the carrier.

FIG. 13B is a partial front view of the mobile pet carrier of FIG. 13A.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Certain aspects and features of the present disclosure relate to pet containment. The embodiments of the present disclosure described below are not intended to be exhaustive or to limit the disclosure to the precise forms described herein. Rather, the embodiments described herein are chosen so that a person of skill in the art can appreciate and understand the principles and practices of the present disclosure. Reference may be made herein to PCT Publication No. WO 2018/169693, entitled "Collapsible Animal Containment Assembly," which is incorporated herein by reference in its entirety.

As used herein, directional and spatial terms such as "right," "left," "top," "bottom," "front," "rear," "horizontal," "vertical," "horizontally," "vertically," and "upward" are not intended to be binding terms.

Figure 2:
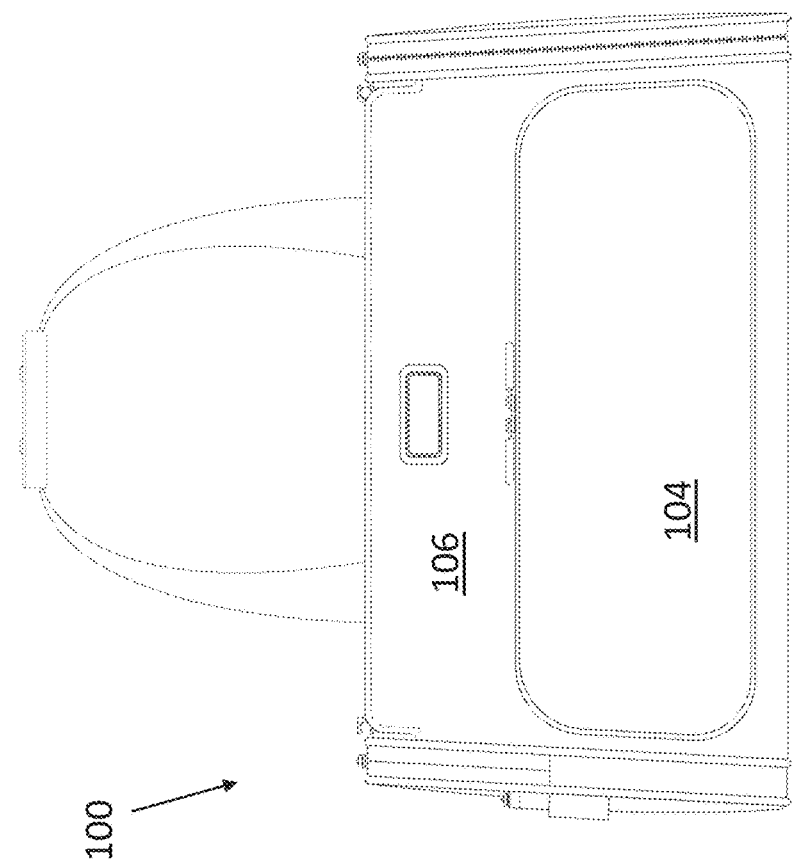
FIG. 2 is a front view of the mobile pet carrier of FIG. 1.
Figure 1:
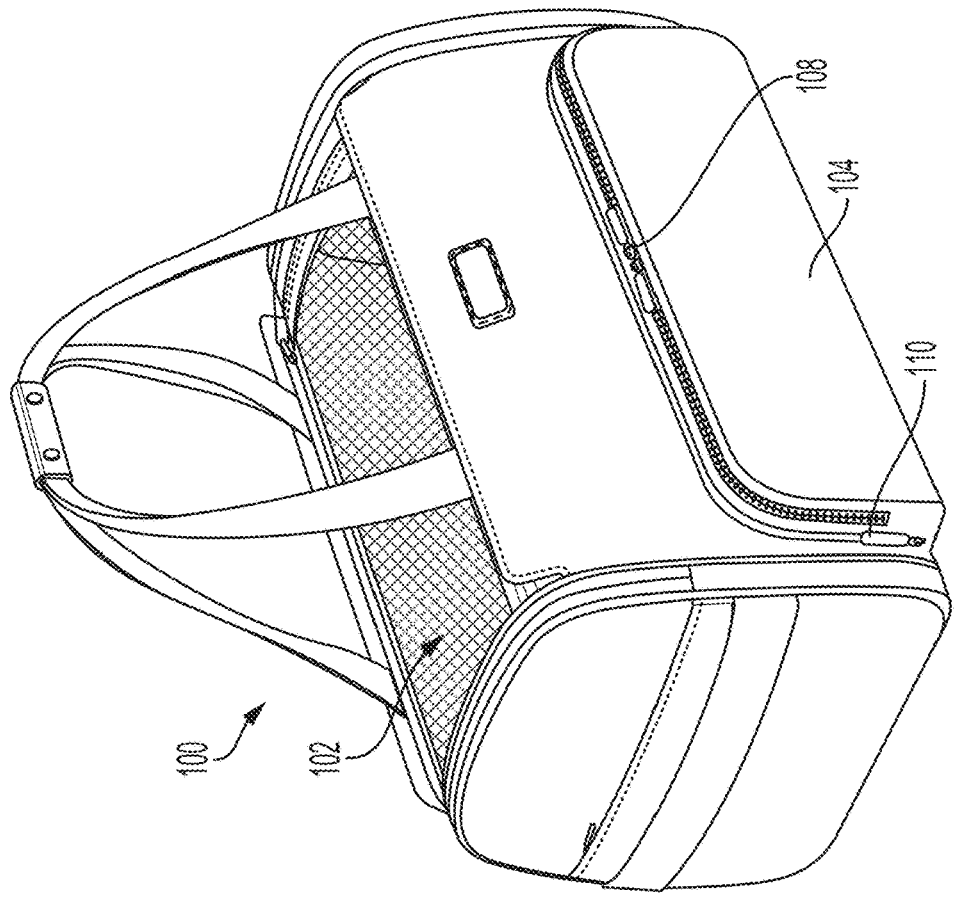
FIG. 1 is a perspective view of the mobile pet carrier according to certain embodiments of the present disclosure.

Described are various embodiments of a mobile pet carrier 100 as shown in FIG. 1. The mobile pet carrier 100 is designed to enable pet owners to safely and comfortably transport their pets using any number of transportation options, e.g., by car, airplane, train, boat, etc. The overall dimensions of the mobile pet carrier 100 may be substantially 20 inches in width, substantially 10.8 inches in height, and substantially 11.5 inches in depth. In some embodiments, the mobile pet carrier 100 may be substantially 19-21 inches, substantially 18-20, substantially 20-22 inches, substantially 19-20 inches, or substantially 20-21 inches in width, substantially 10-11 inches, substantially 10-12 inches, substantially 9-11 inches, substantially 9-12 inches in height, and substantially 10-11 inches, substantially 9-11 inches, substantially 9-12 inches, or substantially 10-12 inches in depth. The width of the mobile pet carrier 100 may be greater than both the height and depth of the mobile pet carrier 100. In some embodiments, the width of the mobile pet carrier 100 is at least twice the height and at least twice the depth of the mobile pet carrier 100. In further embodiments, the height and depth of the mobile pet carrier 100 are substantially the same.

The mobile pet carrier 100, and any combination of the various components forming the mobile pet carrier 100, may be formed of nylon, nylon plastic, polyester, rubber, thermoplastic rubber, thermoplastic polyurethane, mesh, leather, polyurethane leather, laminate, polymer, elastomeric polymer, ethylene-vinyl acetate, thermoplastic polymer, plastic, metal, knitted textile, woven textile, or any other suitable material. The material selected for various components of the mobile pet carrier 100 may be selected to provide enhanced durability to the mobile pet carrier 100 by reducing the scratching and smudging of the carrier during use.

In some embodiments, the carrier 100 has multiple pockets, compartments, and openings to aid in the carrier's 100 use during travel. The main compartment 102 is the area of the carrier 100 that a pet may occupy during use of the carrier 100. The main compartment 102 may be sized to fit a pet weighing less than approximately 18 lbs., weighing less than approximately 20 lbs., weighing less than approximately 15 lbs., etc. However, the carrier 100 may be designed so that the main compartment 102 is sized to fit any suitable size and weight of pet. A pet bed may be inserted into the main compartment 102 to add additional comfort for the pet. An inner surface of the main compartment 102 may include a hook and loop fastener to assist in securing the pet bed relative to the carrier 100.

In certain embodiments, the carrier 100 includes a front pocket 104 arranged on a front side 106 of the carrier 100. As shown in FIGS. 1-4, the front pocket 104 may feature a double zipper opening feature. Opening a first zipper 108 of the front pocket 104 may provide access to an interior storage area 112 of the front pocket. The interior storage area may have any suitable number of pockets, e.g., pockets 114A-C, compartments, or other storage spaces that may hold various items. Opening a second zipper 110 of the front pocket 104 may enable a front opening cover 118 to move away from the front side 106 and reveal an opening 116 in the front side 106 of the carrier 100 that provides wide and low access to the main compartment. Additionally, the front pocket 104 may be arranged on or coupled to exterior portion of the front opening cover 118.

In some embodiments, the second zipper 110 may be arranged substantially between the front side 106 of the carrier 100 and the first zipper 108 so that the opening 116 in the front side 106 of the carrier 100 is accessible without having to open the front pocket 104 and the front pocket 104 is accessible without having to open the second zipper 110. Though various embodiments discuss the use of zippers for opening and closing compartments, pockets, etc., any suitable fastener, e.g., a zipper, a hook and loop fastener, snap buttons, tie strings, magnets, straps, latches, etc., may be used. Additionally, any suitable number of pockets and/or compartments in addition to the front pocket 104 may be included on the front side 106 of the carrier 100.

Figure 5:
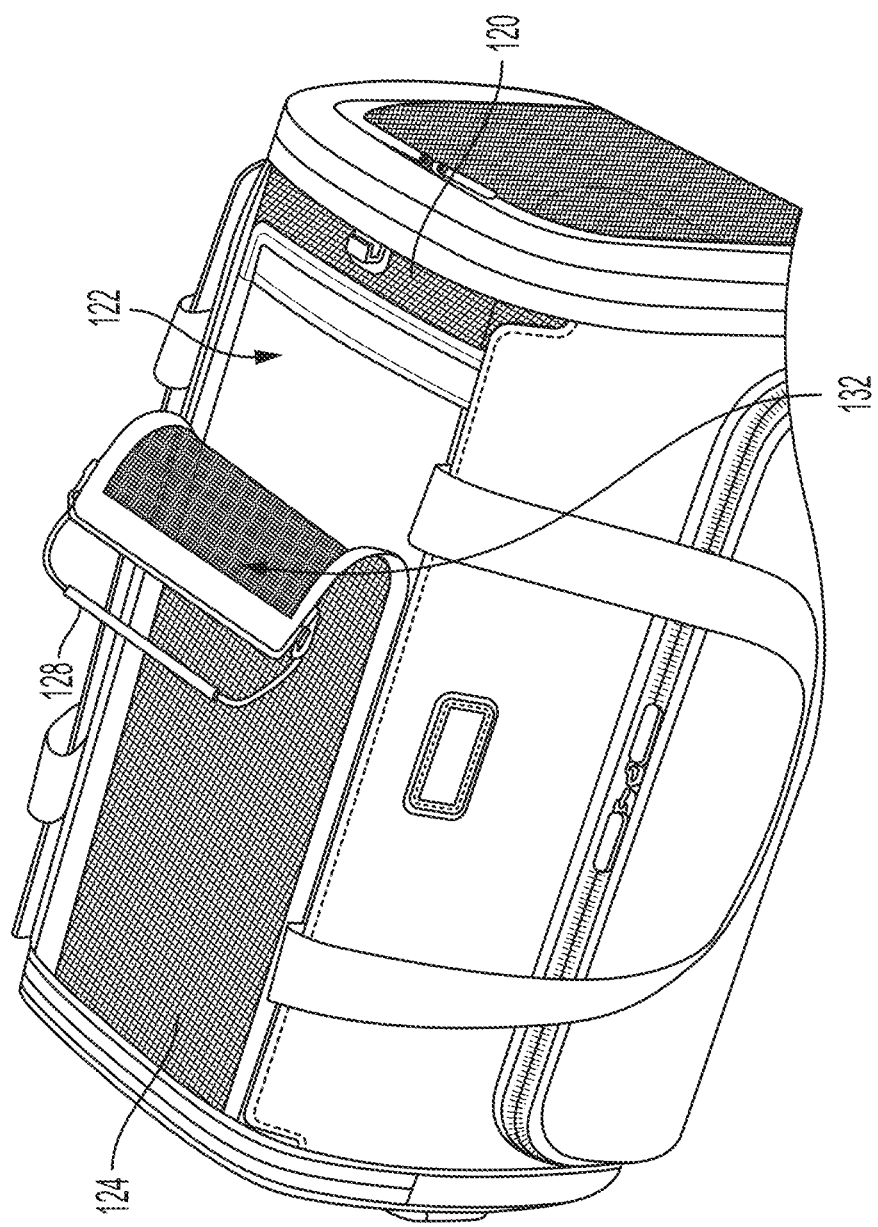
FIG. 5 is a partial perspective view of the mobile pet carrier of FIG. 1 with the cover panel partially opened to reveal the top opening.
Figure 7:
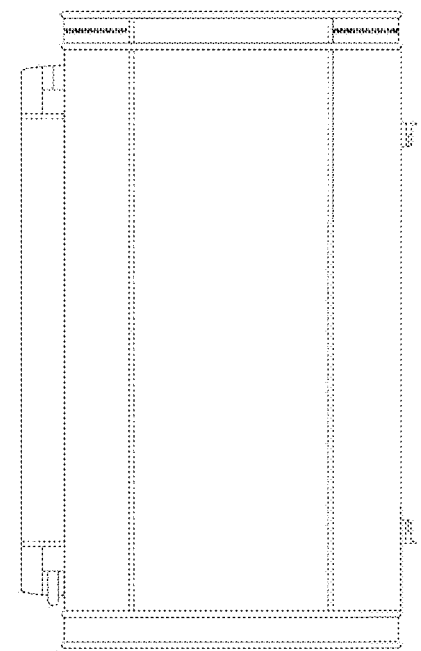
FIG. 7 is a bottom view of the mobile pet carrier of FIG. 1
Figure 6:
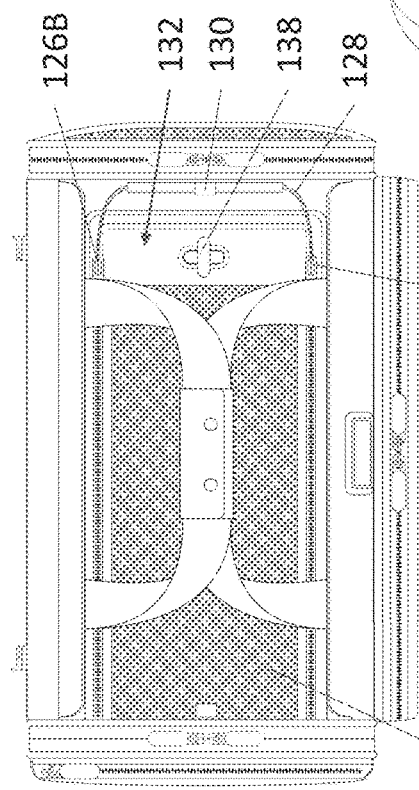
FIG. 6 is a top view of the mobile pet carrier of FIG. 1.
Figure 8:
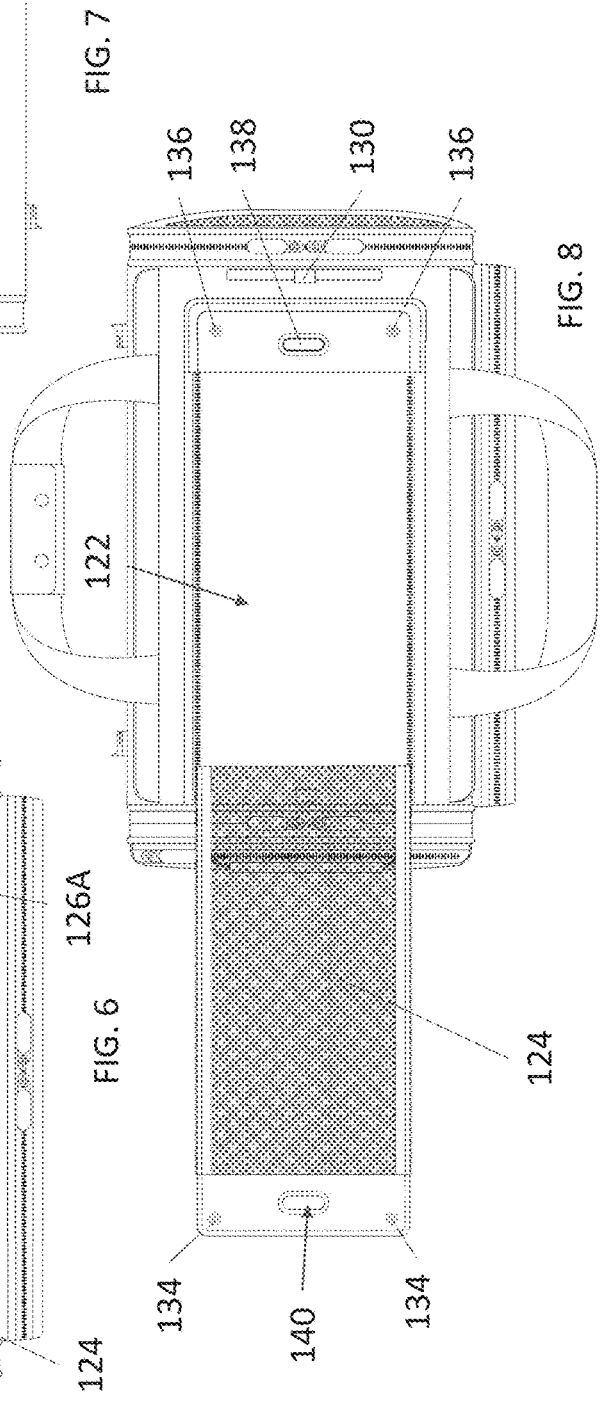
FIG. 8 is a top view of the mobile pet carrier of FIG. 1 with the cover panel opened to reveal the top opening.

In certain embodiments, the carrier 100 includes a top opening 122 arranged on a top side 120 of the carrier 100. The top opening 122 is sized to permit a pet to enter or exit the main compartment 102 through the top opening 122. For example, the top opening 122 may extend along a majority of the width of the top side 120. As shown in FIGS. 5-6 and 8, the top opening 122 may be opened and closed by a cover panel 124. The cover panel 124 may be formed of any suitable material, e.g., mesh or any other breathable fabric or material to provide ventilation to the main compartment. The cover panel 124 may feature zippers 126A-B on at least two sides of the cover panel 124. The zippers 126A-B may extend on opposite sides of the cover panel 124 along at least part of a longitudinal length of the carrier 100. In some embodiments, the zippers 126A-B include two zippers that may be connected to one another via a pull handle 128 or any other suitable connector. By connecting the two zippers to one another via the pull handle 128, a user may open or close the top opening using only one hand by pulling on the pull handle 128 to move the two zippers simultaneously along the longitudinal length of the carrier 100.

Additionally, at least one handle clip 130 may be arranged on the top side 120 and/or another side of the carrier. A portion of the pull handle 128 may be hooked under, snap fit, friction fit, etc. with the at least one handle clip 130 to secure the pull handle 128. Securing the pull handle 128 relative to the at least one handle clip 130 may also assist in preventing an inadvertent opening of the top opening 122.

In some embodiments, the cover panel 124 includes at least one closure end 132. The at least one closure end 132 may include various closure devices that may assist in closing the top opening 122 and securing the cover panel 124. For example, the closure end 132 may include at least one embedded magnet 134 and a portion of the top side 120 and/or another side of the carrier 100 may include at least one corresponding embedded magnet 136. When the top opening 122 is closed by the cover panel 124, the at least one embedded magnet 134 and the at least one corresponding embedded magnet 136 substantially align to couple the cover panel 124 with the top side 120 of the carrier 100 and secure the closure of the top opening 122. The magnets 134, 136 may assist in preventing an inadvertent opening of the top opening 122.

Additionally or alternatively, a portion of the top side 120 and/or another side of the carrier 100 may include a twistable closure feature 138. The cover panel 124 may define a securing opening 140 that is sized to permit at least a portion of the twistable closure feature 138 to extend through the securing opening 140 when the top opening 122 is closed by the cover panel 124. A user may twist or rotate the twistable closure feature 138 so that at least a portion of the twistable closure feature 138 overlaps with a portion of the cover panel 124 to secure the cover panel 124 to the top side 120 of the carrier 100, as may be seen in FIG. 6. The twistable closure feature 138 may assist in preventing an inadvertent opening of the top opening 122.

In some embodiments, the top side 120 may also include a privacy cover that extends at least partially across the cover panel 124, e.g., the privacy cover may be sized to cover any mesh portions of the cover panel 124. The privacy cover may be formed of the same material or different material as the exterior of other side portions of the carrier 100 to provide privacy for the pet occupying the main compartment 102 as well as additional protection from the weather without hindering the ventilation of the carrier. Additionally, the privacy cover may be completely separable from and coupleable to the carrier 100.

In certain embodiments, as shown in FIGS. 9-14, the carrier 100 includes various pockets, compartments, vents, and openings arranged on a right side 142 and a left side 144 of the carrier 100. For example, as may be seen at least in FIGS. 9-10, at least one of the right side 142 or the left side 144 may include a strap 146 extending across the respective side. The strap 146 may be used to pull the carrier 100 out from under a passenger seat or other location.

Figure 10:
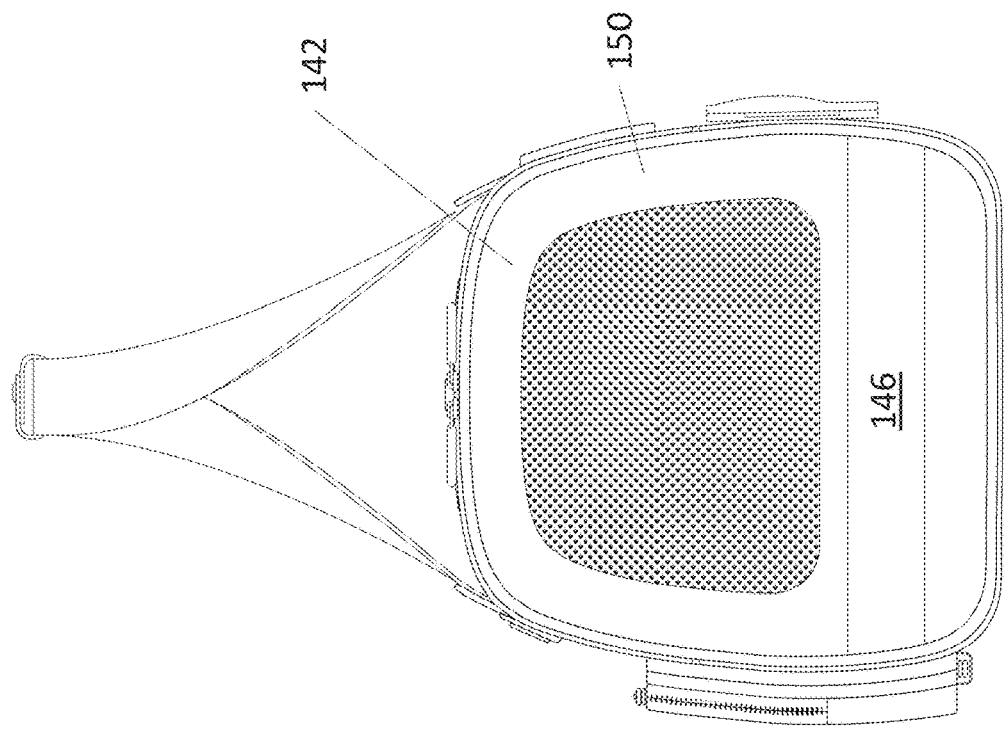
FIG. 10 is a right view of the mobile pet carrier of FIG. 1.
Figure 9:
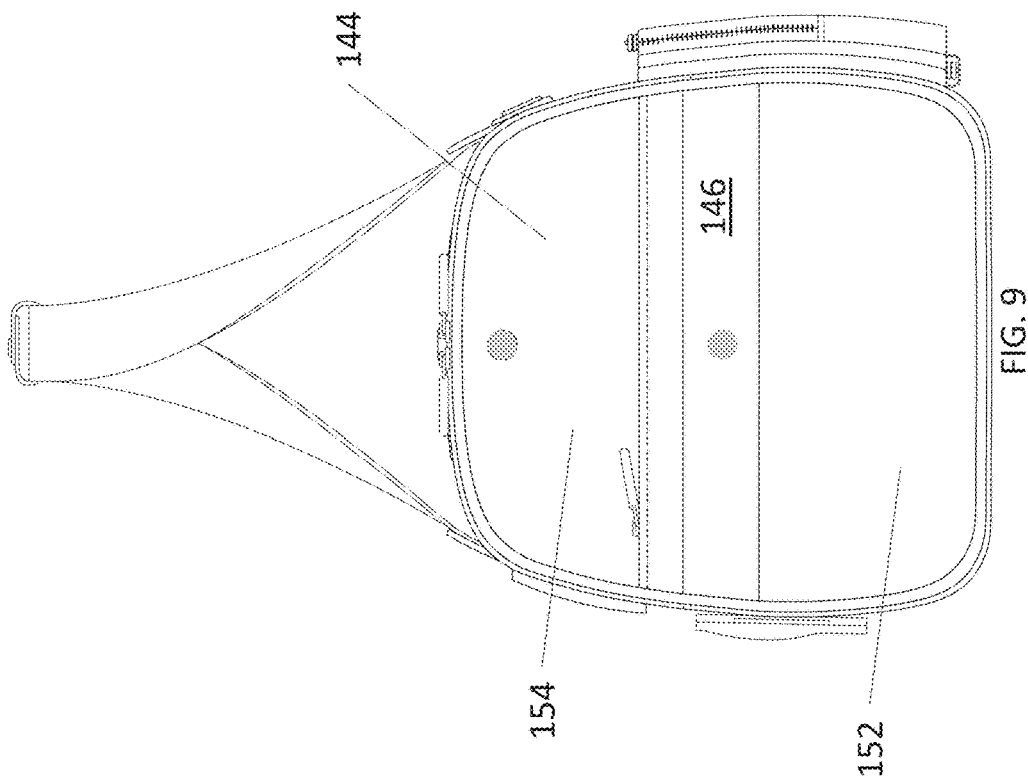
FIG. 9 is a left side view of the mobile pet carrier of FIG. 1.
Figure 11:
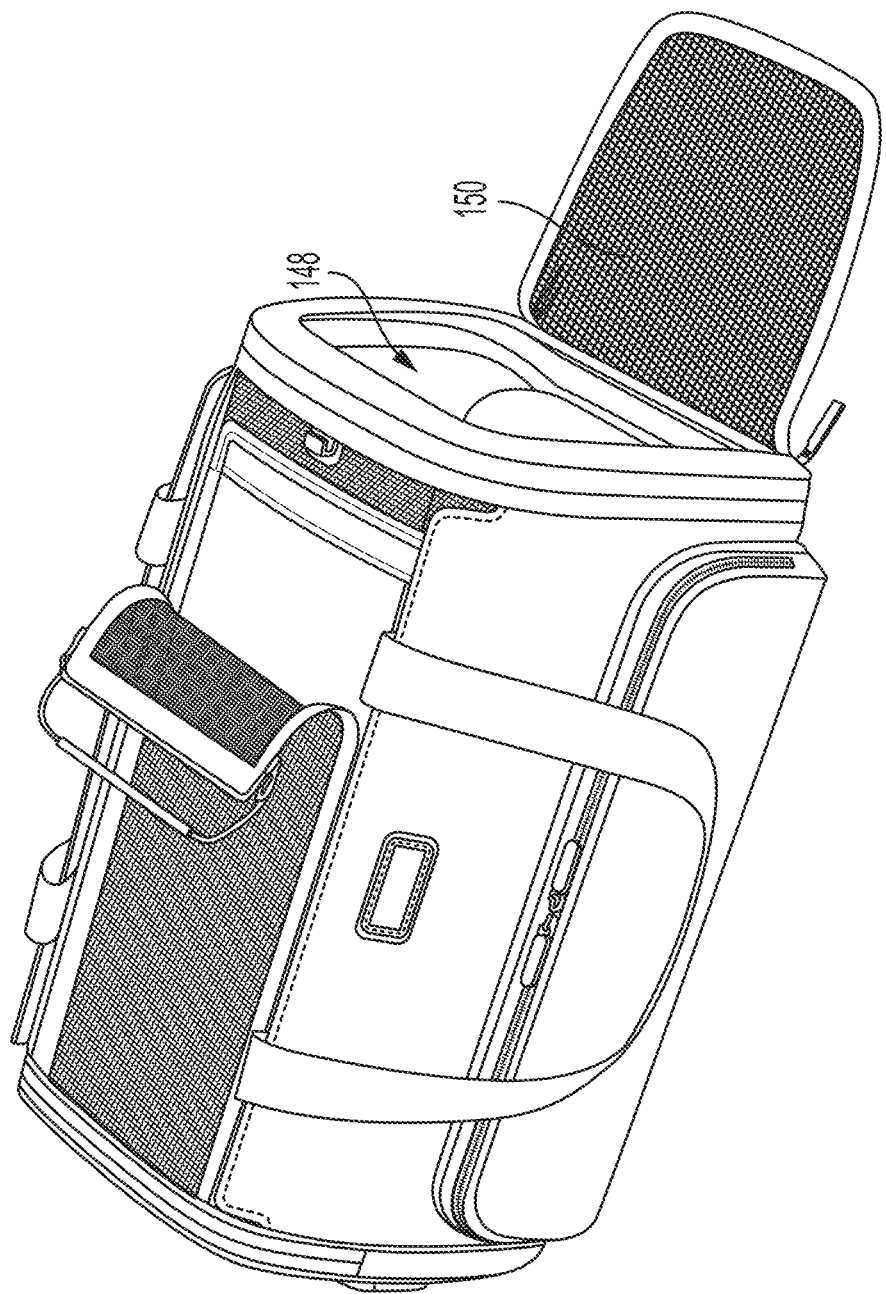
FIG. 11 is a perspective view of the mobile pet carrier of FIG. 1 with the cover panel partially opened to reveal the top opening and the side cover panel opened to reveal the side opening.

As may be seen at least in FIGS. 10-11, at least one of the right side 142 or left side 144 of the carrier 100 may define a side opening 148 through which a pet may enter or exit the main compartment 102 of the carrier 100. The side opening 148 may be closed by a side cover panel 150 using at least one zipper. In some embodiments, the side cover panel 150 may be formed of any suitable combination of materials, e.g., the side cover panel 150 may be formed of nylon, polyester, etc. with at least a portion of the side cover panel 150 being formed of mesh or any other breathable fabric or material to provide ventilation to the main compartment 102. In some embodiments, the side cover panel 150 forms the entire right side 142 so that at least three edges of the right side 142 are separable from the carrier 100 when the side opening 148 is open.

Additionally, as may be seen at least in FIGS. 9 and 12-13B, the right side 142 or left side 144 of the carrier 100 may include a first side pocket 152 that may be opened and closed via a zipper or any other suitable closure means. On the same side as the first side pocket 152 may be a side compartment 154 that may be opened and closed via a zipper or any other suitable closure means. The first side pocket 152 may be arranged on or coupled to an exterior surface of the side compartment 154. In some embodiments, the side compartment 154 is opened to reveal a vent 156 formed of mesh or any other breathable fabric or material to provide ventilation to the main compartment 102. Additionally, a second side pocket 158 may be arranged within the side compartment 154 and may only be accessible when the side compartment 154 is opened. The second side pocket 158 may be opened and closed via a zipper or any other suitable closure means.

In certain embodiments, the side compartment 154 includes a foldable panel 160. When the side compartment 154 is opened, the foldable panel 160 may be folded and secured between the strap 146 and the side of the carrier 100. Securing the foldable panel 160 between the strap 146 and the side of the carrier 100 permits the vent 156 to remain exposed. Additionally, the foldable panel 160 and at least one of the strap 146 or the first side pocket 152 may include embedded magnets 162 that may also assist in securing the foldable panel 160 to maintain the exposure of the vent 156.

Figure 15:
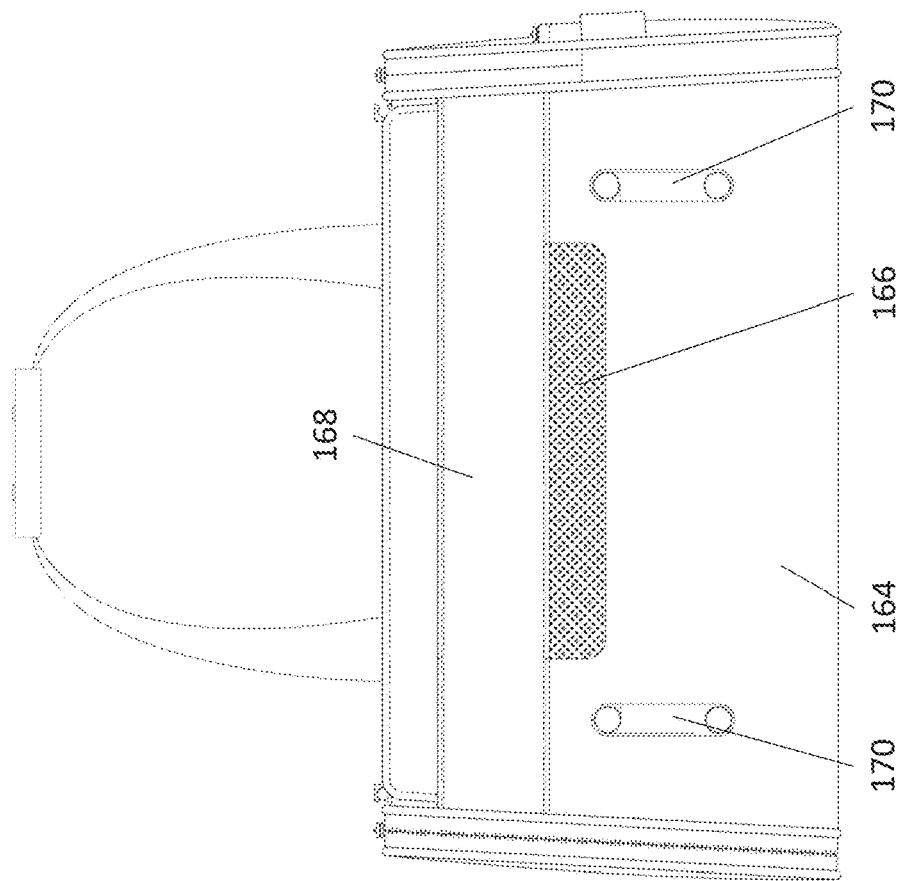
FIG. 15 is a rear view of the mobile pet carrier of FIG. 1.
Figure 14:
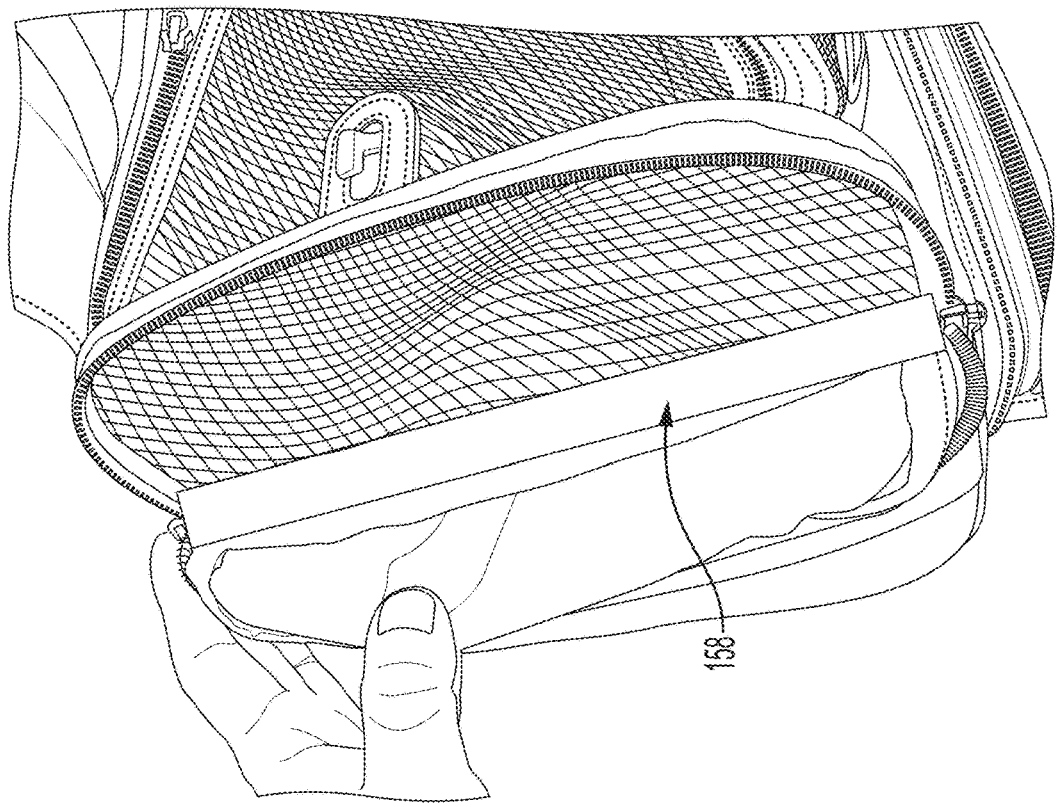
FIG. 14 is a perspective view of the interior of the side compartment of the mobile pet carrier according to certain embodiments of the present disclosure.
Figure 18:
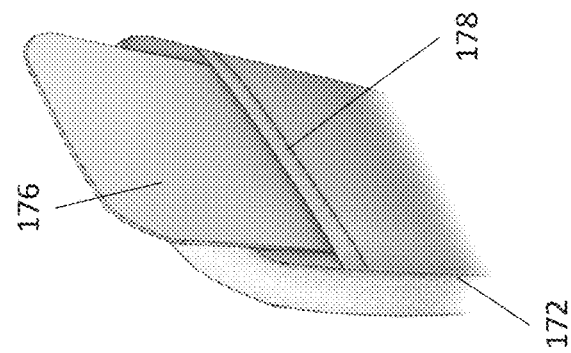
FIG. 18 is a partial perspective view of the bed of FIG. 17 with a semi-rigid interior plate partially removed from the bed.
Figure 17:
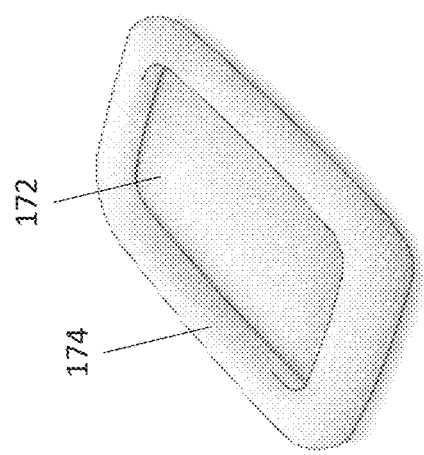
FIG. 17 is a perspective view of the bed removed from the mobile pet carrier of FIG. 1.
Figure 16:
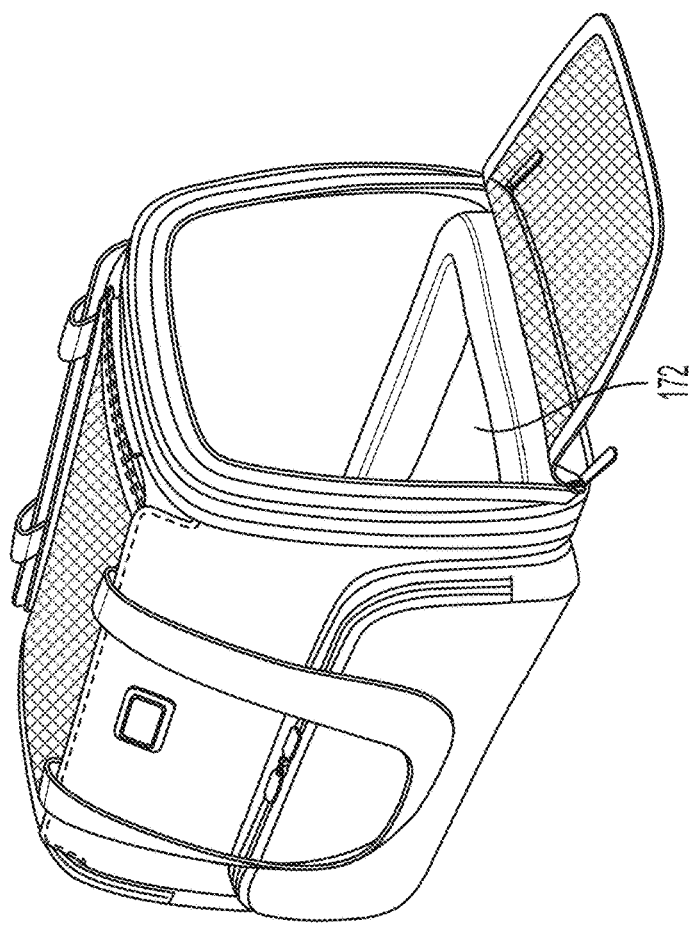
FIG. 16 is a perspective view of the mobile pet carrier with a bed according to certain embodiments of the present disclosure.
Figure 20:
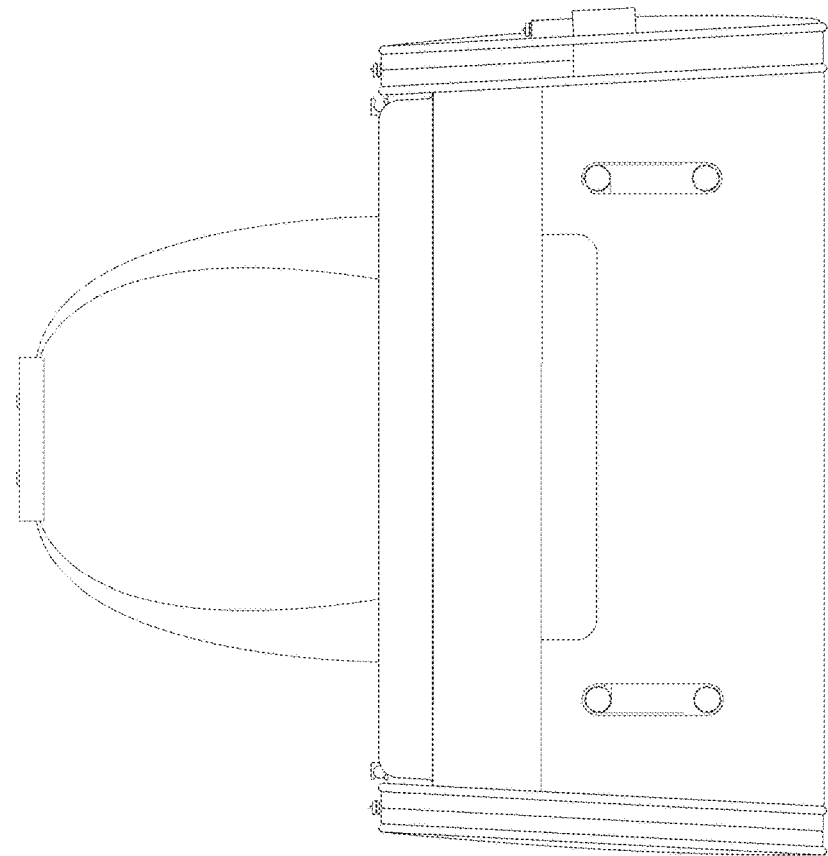
FIG. 20 is a rear view of the mobile pet carrier of FIG. 19.
Figure 19:
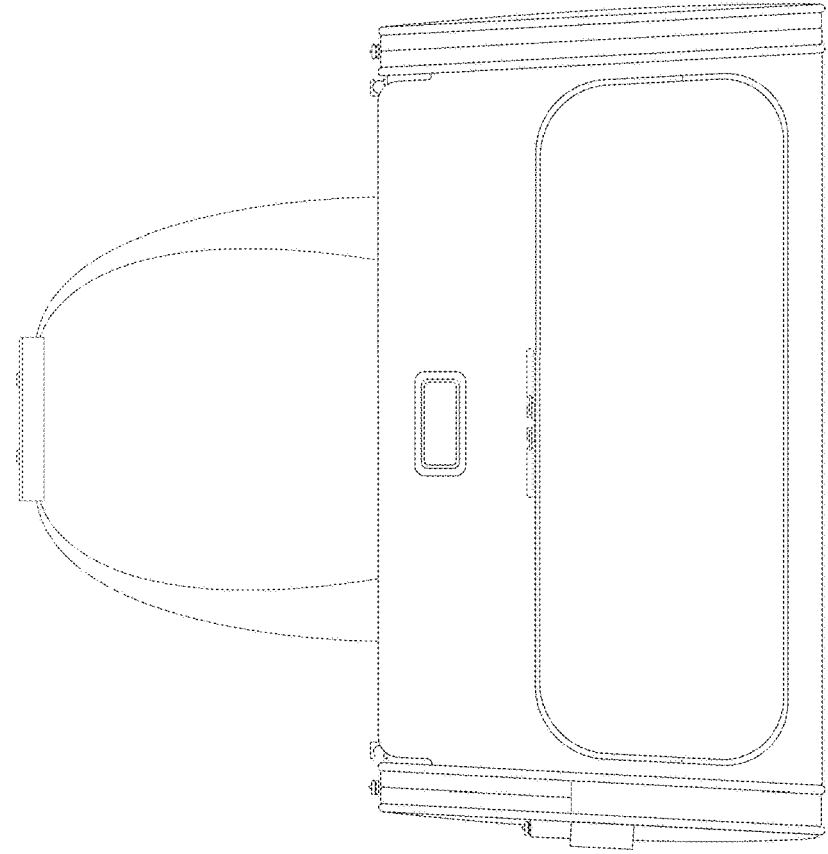
FIG. 19 is a front view of the mobile pet carrier according to certain embodiments of the present disclosure.
Figure 22:
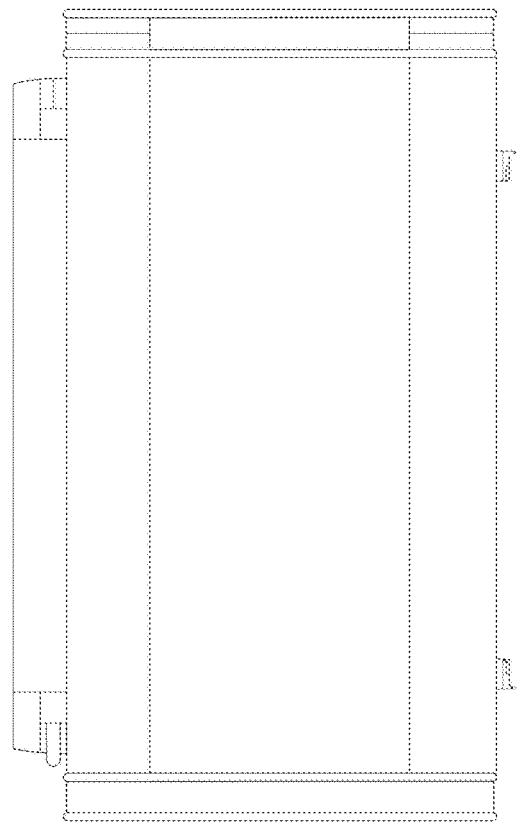
FIG. 22 is a bottom view of the mobile pet carrier of FIG. 19.
Figure 21:
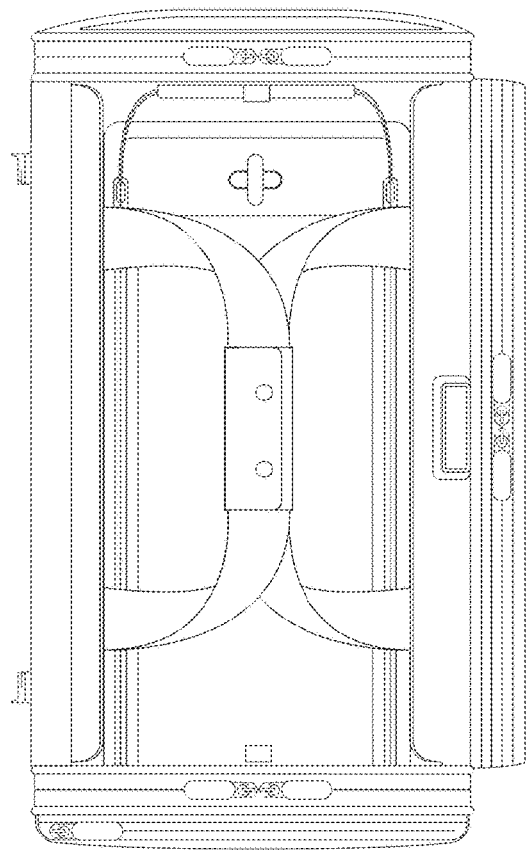
FIG. 21 is a top view of the mobile pet carrier of FIG. 19.
Figure 24:
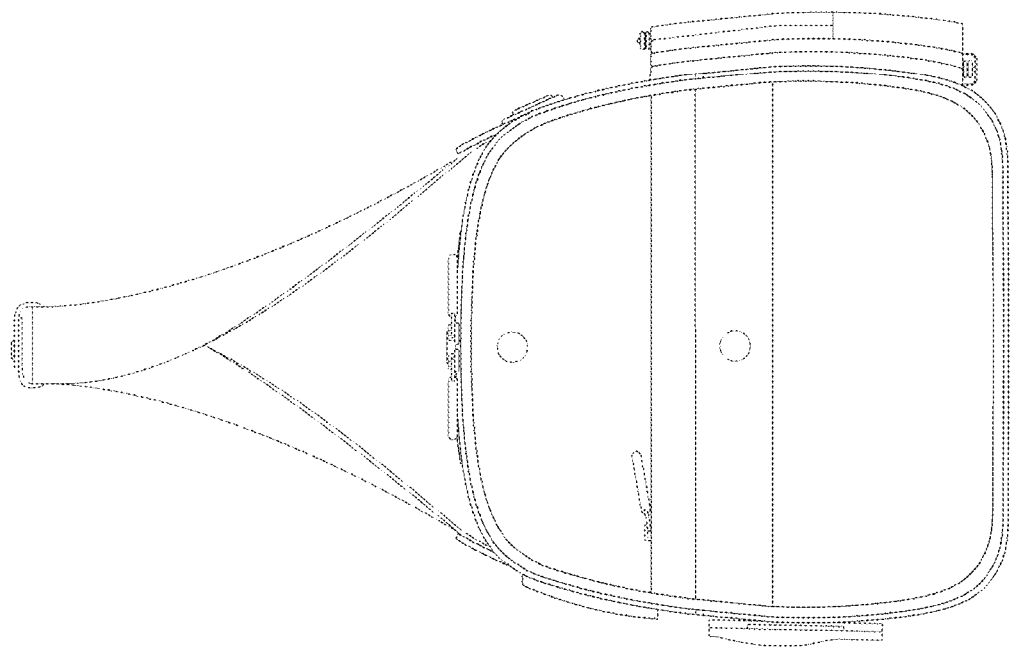
FIG. 24 is a left side view of the mobile pet carrier of FIG. 19.
Figure 23:
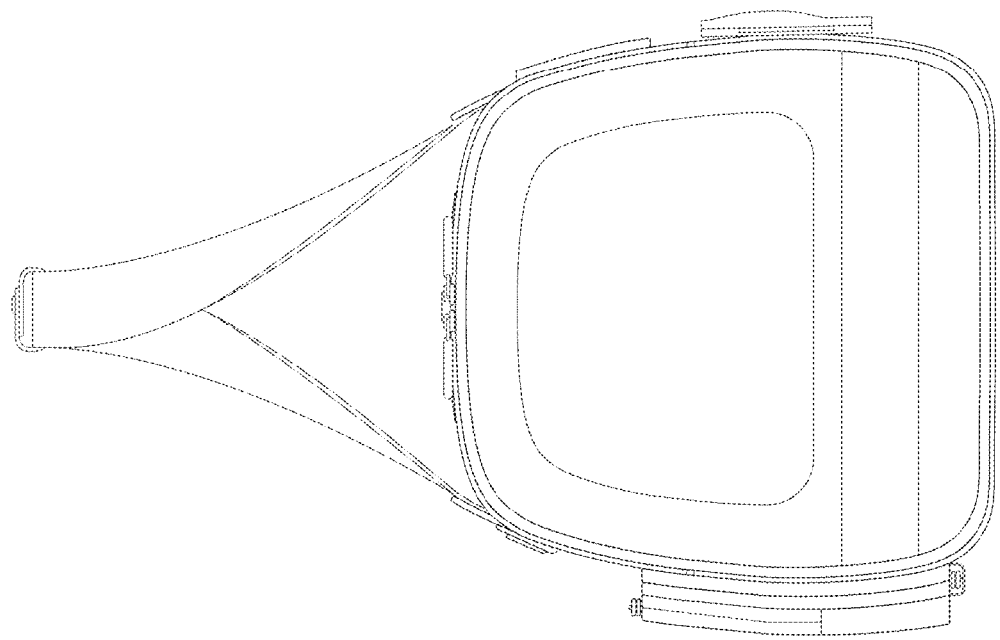
FIG. 23 is a right side view of the mobile pet carrier of FIG. 19.

In some embodiments, as shown at least in FIG. 15, a rear side 164 of the carrier includes a rear vent portion 166 and a securing strap 168. The securing strap 168 may define an opening between the securing strap 168 and the rear side 164 of the carrier 100 through which a handle of a rolling suitcase may be inserted. The opening between the securing strap 168 and the rear side 164 of the carrier 100 may be sized to limit potential horizontal movement of the carrier 100 relative to the rolling suitcase to provide a secure placement of the carrier 100 on the rolling suitcase. For example, the width of the opening between the securing strap 168 and the rear side 164 of the carrier 100 may be the same as the width of the rear vent portion 166.

Additionally, at least the rear side 164 of the carrier 100 may include at least one seat belt member 170 to facilitate the attachment of the carrier 100 to a seatbelt. For example, the at least one seat belt member 170 may be a clip that secure the seat belt to the carrier 100. In certain embodiments, the carrier 100 includes additional features, e.g., D-rings, strap clips, buckles, etc. that may provide additional attachment points for the carrier 100 to a seatbelt and or for attaching a harness or collar of a pet to the carrier 100. These additional attachment points may improve the safety of the carrier 100 for the pet. For example, an additional seat belt wrap may be attached to a portion of the top side 120 of the carrier 100 and a chest-strap portion of the seatbelt. Thus, the seat belt wrap may reduce the risk of the carrier 100 flipping out of the seat.

In certain embodiments, at least a portion of each side of the carrier 100 will be at least partially formed of a semi-rigid material. For example, at least one inner layer may be formed of any combination of a laminate, a thermoplastic polyurethane, an elastomeric polymer, a thermoplastic polymer, a plastic, etc. to provide a semi-rigid structure to the corresponding portions of each side. In some embodiments, the at least one inner layer may be a woven laminate structure. In further embodiments, the at least one inner layer may be formed at least partially of ethylene-vinyl acetate, and the at least one inner layer may have a thickness of approximately 3 mm. Forming these portions to provide a semi-rigid structure to each side causes the carrier to maintain its overall shape regardless of which sides, panels, pockets, compartments, etc. are open. Additionally, at least one second inner layer may be formed of a foam and may have a thickness of approximately 3 mm. The at least one inner layer and the at least one second inner layer may be at least partially or completely surrounded by an exterior fabric layer.

In some embodiments, the materials and features of the carrier 100 are selected so that the carrier 100 meets the Pet Safety Certification Testing through the Carrier Crash Test Protocol and Rating System conducted by the Center for Pet Safety®. The safety standard CPS-001-016.01 developed by the Center for Pet Safety® is used to evaluate pet carriers and other pet accessories for their crash protection. The CPS-001-016.01 standard references the test conditions and equipment used in the Federal Motor Vehicle Safety Standard No. 213 but grades the products differently than a child's car seat. For example, the CPS-001-016.01 grades, e.g., using a point system, on the following areas: (1) having an excursion measurement of less than or equal to 32 inches; (2) carrier closure, e.g., clasps, zippers, etc., integrity; (3) carrier integrity, e.g., the integrity of the construction of the carrier; and (4) lift, which is a measurement of how high the carrier rises of the bench seat during the testing.

In some embodiments, the mobile pet carrier 100 may include a bed portion 172 positioned within the main compartment 102. The bed portion 172 may be fully removable from the carrier 100. The bed portion 172 may include bolster edges 174 that completely surround the bed portion 172. Additionally, a semi-rigid interior plate 176 may be arranged within a sleeve 178 on an underside of the bed portion 172 to provide additional structure to the bed portion 172. In some embodiments, the semi-rigid interior plate 176 may be removed from the sleeve 178 and may be sized to fit within the bolster edges 174 of the bed portion 172. Further, an absorbent waste sheet, e.g., a puppy pee pad, may be wrapped around the semi-rigid interior plate 176. The wrapped sheet and semi-rigid interior plate 176 may be arranged on an upper surface of the bed portion 172 so that the edges of the wrapped sheet and semi-rigid interior plate 176 are positioned at least partially between the upper surface of the bed portion 172 and the bolster edges 174.

Although various features are discussed relative to a top side, front side, rear side, left side, or right side of the carrier 100, it is understood that any of these various features may be incorporated onto alternative or additional sides.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. In the following, further examples are described to facilitate understanding of aspects of the invention:

Example 1. A mobile pet carrier (which may incorporate features of any of the subsequent examples) comprising: a base member, a first side member, a second side member, a third side member, a fourth side member, and a top member; and an interior compartment sized to hold at least one animal and defined by the base member, the first side member, the second side member, the third side member, the fourth side member, and the top member; wherein the first side member defines a first side opening that provides access to the interior compartment through the first side member and comprises a first side opening cover that closes the first side opening using at least one first fastener; wherein the top member defines a top opening that provides access to the interior compartment and comprises a top opening cover that closes the top opening using at least one second fastener; and wherein the second side member defines a second side opening that provides access to the interior compartment and comprises a second side opening cover that closes the second side opening using at least one third fastener.

Example 2. The mobile pet carrier of example(s) 1 or any preceding or subsequent example(s) or combination of examples, further comprising a first side pocket coupled to an exterior portion of the first side opening cover.

Example 3. The mobile pet carrier of example(s) 1 or any preceding or subsequent example(s) or combination of examples, further comprising a first top opening fastener and a second top opening fastener arranged on opposite sides of the top opening cover.

Example 4. The mobile pet carrier of example(s) 3 or any preceding or subsequent example(s) or combination of examples, further comprising a single pull handle coupled to the first top opening fastener and the second top opening fastener, the top opening being openable and closable using the single pull handle.

Example 5. The mobile pet carrier of example(s) 4 or any preceding or subsequent example(s) or combination of examples, further comprising a clip positioned on at least one of the first side member, the second side member, the third side member, the fourth side member, or the top member, wherein the single pull handle is coupleable to the clip to secure the single pull handle.

Example 6. The mobile pet carrier of example(s) 1 or any preceding or subsequent example(s) or combination of examples, further comprising a closure device arranged at a first end of the top opening cover that couples the top opening cover to the top member.

Example 7. The mobile pet carrier of example(s) 6 or any preceding or subsequent example(s) or combination of examples, wherein the closure device comprises at least one of a magnet or a twistable closure feature.

Example 8. A mobile pet carrier (which may incorporate features of any of the preceding or subsequent examples) comprising: a base member, a first side member, a second side member, a third side member, a fourth side member, and a top member; and an interior compartment sized to hold at least one animal and defined by the base member, the first side member, the second side member, the third side member, the fourth side member, and the top member; wherein the third side member comprises at least one pocket and at least one side compartment, the at least one pocket being coupled to an exterior portion of the at least one side compartment; wherein the at least one side compartment comprises a foldable panel movable between a closed position and an open position; and wherein, in the open position, a mesh portion of the third side member is exposed to provide ventilation to the interior compartment.

Example 9. The mobile pet carrier of example(s) 8 or any preceding or subsequent example(s) or combination of examples, wherein the third side member further comprises at least one strap.

Example 10. The mobile pet carrier of example(s) 9 or any preceding or subsequent example(s) or combination of examples, wherein, in the open position, at least a portion of the foldable panel is arranged between the at least one strap and the third side member.

Example 11. The mobile pet carrier of example(s) 9 or any preceding or subsequent example(s) or combination of examples, wherein at least one of the at least one pocket or the at least one strap comprises at least one first magnet and the foldable panel comprises at least one second magnet.

Example 12. The mobile pet carrier of example(s) 11 or any preceding or subsequent example(s) or combination of examples, wherein, in the open position, the at least one first magnet engages with the at least one second magnet.

Example 13. The mobile pet carrier of example(s) 8, or any preceding or subsequent example(s) or combination of examples further comprising at least one second pocket arranged within the at least one side compartment.

Example 14. A mobile pet carrier (which may incorporate features of any of the preceding or subsequent examples) comprising: a base member, a first side member, a second side member, a third side member, a fourth side member, and a top member; and an interior compartment sized to hold at least one animal and defined by the base member, the first side member, the second side member, the third side member, the fourth side member, and the top member; wherein the first side member defines a first side opening that provides access to the interior compartment through the first side member and comprises a first side opening cover that closes the first side opening using at least one first fastener; wherein the top member defines a top opening that provides access to the interior compartment and comprises a top opening cover that closes the top opening using at least one second fastener; wherein the second side member defines a second side opening that provides access to the interior compartment and comprises a second side opening cover that closes the second side opening using at least one third fastener; wherein the third side member comprises at least one pocket and at least one side compartment, the at least one pocket being coupled to an exterior portion of the at least one side compartment; wherein the at least one side compartment comprises a foldable panel movable between a closed position and an open position; and wherein, in the open position, a mesh portion of the third side member is exposed to provide ventilation to the interior compartment.

Example 15. The mobile pet carrier of example(s) 14 or any preceding or subsequent example(s) or combination of examples, further comprising: a first top opening fastener and a second top opening fastener arranged on opposite sides of the top opening cover; a single pull handle coupled to the first top opening fastener and the second top opening fastener, the top opening being openable and closable using the single pull handle; and a clip positioned on at least one of the first side member, the second side member, the third side member, the fourth side member, or the top member, wherein the single pull handle is coupleable to the clip to secure the single pull handle.

Example 16. The mobile pet carrier of example(s) 14 or any preceding or subsequent example(s) or combination of examples, further comprising a closure device arranged at a first end of the top opening cover that couples the top opening cover to the top member; wherein the closure device comprises at least one of a magnet or a twistable closure feature.

Example 17. The mobile pet carrier of example(s) 14 or any preceding or subsequent example(s) or combination of examples, wherein: the third side member further comprises at least one strap; in the open position, at least a portion of the foldable panel is arranged between the at least one strap and the third side member; at least one of the at least one pocket or the at least one strap comprises at least one first magnet and the foldable panel comprises at least one second magnet; and in the open position, the at least one first magnet engages with the at least one second magnet.

Example 18. The mobile pet carrier of example(s) 14 or any preceding or subsequent example(s) or combination of examples, further comprising at least one second pocket arranged within the at least one side compartment.

Example 19. The mobile pet carrier of example(s) 14 or any preceding or subsequent example(s) or combination of examples, further comprising a removable bed portion; wherein the removable bed portion comprises: a plurality of bolster edges, and a sleeve, wherein a removable, semi-rigid interior plate is positionable within the sleeve.

Example 20. The mobile pet carrier of example(s) 19 or any preceding example(s) or combination of examples, wherein the removable, semi-rigid interior plate is removable from the sleeve and at least a portion of the removable, semi-rigid interior plate is positionable between an upper surface of the removable bed portion and the plurality of bolster edges.

What is claimed is:

1. A mobile pet carrier comprising:
a base member, a first side member, a second side member, a third side member, a fourth side member, a top member, and a first side pocket; and
an interior compartment sized to hold at least one animal and defined by the base member, the first side member, the second side member, the third side member, the fourth side member, and the top member;
wherein the first side member defines a first side opening that provides access to the interior compartment through the first side member and comprises a first side opening cover that closes the first side opening using at least one first fastener;
wherein the first side pocket is coupled to an exterior portion of the first side opening cover;
wherein the top member defines a top opening that provides access to the interior compartment and comprises a top opening cover that closes the top opening using at least one second fastener; and
wherein the second side member defines a second side opening that provides access to the interior compartment and comprises a second side opening cover that closes the second side opening using at least one third fastener.

2. The mobile pet carrier of claim 1, further comprising a first top opening fastener and a second top opening fastener arranged on opposite sides of the top opening cover.

3. The mobile pet carrier of claim 2, further comprising a single pull handle coupled to the first top opening fastener and the second top opening fastener, the top opening being openable and closable using the single pull handle.

4. The mobile pet carrier of claim 3, further comprising a clip positioned on at least one of the first side member, the second side member, the third side member, the fourth side member, or the top member, wherein the single pull handle is coupleable to the clip to secure the single pull handle.

5. The mobile pet carrier of claim 1, further comprising a closure device arranged at a first end of the top opening cover that couples the top opening cover to the top member.

6. The mobile pet carrier of claim 5, wherein the closure device comprises at least one of a magnet or a twistable closure feature.

7. A mobile pet carrier comprising:
a base member, a first side member, a second side member, a third side member, a fourth side member, and a top member; and
an interior compartment sized to hold at least one animal and defined by the base member, the first side member, the second side member, the third side member, the fourth side member, and the top member;
wherein the third side member comprises at least one pocket and at least one side compartment, the at least one pocket being coupled to an exterior portion of the at least one side compartment;
wherein the at least one side compartment comprises a foldable panel movable between a closed position and an open position; and
wherein, in the open position, a mesh portion of the third side member is exposed to provide ventilation to the interior compartment.

8. The mobile pet carrier of claim 7, wherein the third side member further comprises at least one strap.

9. The mobile pet carrier of claim 8, wherein, in the open position, at least a portion of the foldable panel is arranged between the at least one strap and the third side member.

10. The mobile pet carrier of claim 8, wherein at least one of the at least one pocket or the at least one strap comprises at least one first magnet and the foldable panel comprises at least one second magnet.

11. The mobile pet carrier of claim 10, wherein, in the open position, the at least one first magnet engages with the at least one second magnet.

12. The mobile pet carrier of claim 7, further comprising at least one second pocket arranged within the at least one side compartment.

13. A mobile pet carrier comprising:
a base member, a first side member, a second side member, a third side member, a fourth side member, and a top member; and
an interior compartment sized to hold at least one animal and defined by the base member, the first side member, the second side member, the third side member, the fourth side member, and the top member;
wherein the first side member defines a first side opening that provides access to the interior compartment through the first side member and comprises a first side opening cover that closes the first side opening using at least one first fastener;
wherein the top member defines a top opening that provides access to the interior compartment and comprises a top opening cover that closes the top opening using at least one second fastener;
wherein the second side member defines a second side opening that provides access to the interior compartment and comprises a second side opening cover that closes the second side opening using at least one third fastener;
wherein the third side member comprises at least one pocket and at least one side compartment, the at least one pocket being coupled to an exterior portion of the at least one side compartment;
wherein the at least one side compartment comprises a foldable panel movable between a closed position and an open position; and
wherein, in the open position, a mesh portion of the third side member is exposed to provide ventilation to the interior compartment.

14. The mobile pet carrier of claim 13, further comprising:
a first top opening fastener and a second top opening fastener arranged on opposite sides of the top opening cover;
a single pull handle coupled to the first top opening fastener and the second top opening fastener, the top opening being openable and closable using the single pull handle; and
a clip positioned on at least one of the first side member, the second side member, the third side member, the fourth side member, or the top member, wherein the single pull handle is coupleable to the clip to secure the single pull handle.

15. The mobile pet carrier of claim 13, further comprising a closure device arranged at a first end of the top opening cover that couples the top opening cover to the top member; wherein the closure device comprises at least one of a magnet or a twistable closure feature.

16. The mobile pet carrier of claim 13, wherein:
the third side member further comprises at least one strap;
in the open position, at least a portion of the foldable panel is arranged between the at least one strap and the third side member;
at least one of the at least one pocket or the at least one strap comprises at least one first magnet and the foldable panel comprises at least one second magnet; and
in the open position, the at least one first magnet engages with the at least one second magnet.

17. The mobile pet carrier of claim 13, further comprising at least one second pocket arranged within the at least one side compartment.

18. The mobile pet carrier of claim 13, further comprising a removable bed portion; wherein the removable bed portion comprises:
a plurality of bolster edges, and
a sleeve, wherein a removable, semi-rigid interior plate is positionable within the sleeve.

19. The mobile pet carrier of claim 18, wherein the removable, semi-rigid interior plate is removable from the sleeve and at least a portion of the removable, semi-rigid interior plate is positionable between an upper surface of the removable bed portion and the plurality of bolster edges.

* * * * *